United States Patent [19]

Ahmed et al.

[11] 4,369,083
[45] Jan. 18, 1983

[54] METHOD OF FORMING COMPOSITE LAMINATES

[76] Inventors: Nazeer Ahmed; Myrna M. Ahmed, both of 2808 Via Anacapa, Palos Verdes Estates, Calif. 90274

[21] Appl. No.: 216,617

[22] Filed: Dec. 15, 1980

[51] Int. Cl.³ .............................................. C09J 5/02
[52] U.S. Cl. .................................. 156/307.3; 156/381; 156/324
[58] Field of Search ............ 156/324, 311, 330, 307.3, 156/555, 382, 381

[56] References Cited

U.S. PATENT DOCUMENTS

| | | | |
|---|---|---|---|
| 3,721,597 | 3/1973 | Colburn | 156/324 |
| 4,151,031 | 4/1979 | Goad et al. | 156/201 |
| 4,220,029 | 9/1980 | Ahmed et al. | 72/262 |
| 4,242,897 | 1/1981 | Ahmed et al. | 72/262 |

Primary Examiner—George F. Lesmes
Assistant Examiner—Beverly Kaye Johnson

[57] ABSTRACT

Two cooperatively rotating annular wheels are temporarily deformed against each other radially to form a contact length and are partially located in a heated chamber. Each annular wheel is connected to a rotating shaft by flexible means. A positive pressure is maintained in the heated chamber. A plurality of composite plies are fed into the heated chamber where they are clamped and carried by the annular wheels. The clamped plies are subjected to a sustained pressure and temperature along the contact length. The plies are cured under sustained pressure and temperature after which they are cooled under sustained pressure and exit from between the annular wheels as an elongated cured composite laminate.

3 Claims, 5 Drawing Figures

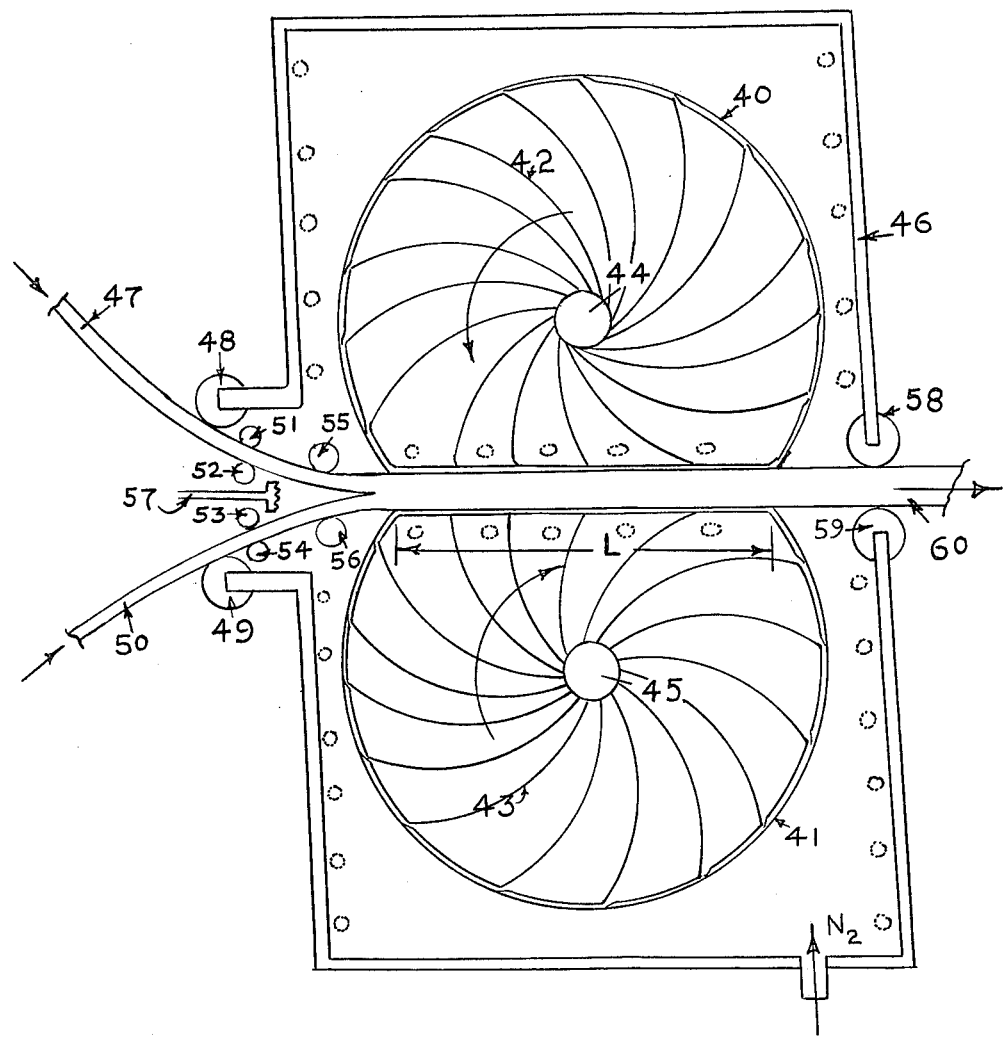
FIG·5

METHOD OF FORMING COMPOSITE LAMINATES

BACKGROUND

This invention describes an improved method of continuously forming a composite laminate.

Composite materials offer the advantages of lightweight, high stiffness, high specific strength, high dimensional stability and have widespread applications in aerospace structures.

Composite laminates are made by laying up plies or layers of composite prepregs—which are sheets of fibers impregnated with a matrix—and curing the layup at elevated temperature and pressure. Most of the layup and handling work on composite laminates is done manually and intermittently. In such intermittent operations, curing is done in heated chambers which are pressurized to 80 to 100 psig. Apart from the inconvenience and expense of manual operations any air leakage in the heated chamber destroys the pressure needed for curing, and results in high void contents in the composite and rejected parts.

STATE OF THE ART

Methods of continuously forming a composite laminate are known. In U.S. Pat. No. 4,151,031 granted to Goad et al., a plurality of composite plies are fed by rollers into a heated chamber containing spring loaded stationary platen which consolidate and join the various plies. The disadvantage of this method is that the plies are moved through stationary platen. Friction between the platen and the plies is high involving risk of damage to the plies as the plies rub against the pressure applying platen.

In U.S. Pat. No. 3,684,645 granted to Temple et al., a method of forming a glass fiber reinforced thermoplastic article is described. In this method, the pressure applying means are a pair of heated, cooperatively rotating belts. Pressure on the thermoplastic article is applied by compressing the belts between a series of complementary rollers. The disadvantage of this method is that no matter how large the roller pressure and no matter how high the tension in the belts, the compressive pressure normal to the laminate falls off between successive complementary roller sets. This drop in pressure may result in high void content in the cured laminate.

It is therefore advantageous to provide a method of continuously making a laminate in which the laminate is subjected to a sustained and uniformly high pressure during cure and in which there is no slippage between the laminate and the pressure applying means.

OBJECTIVE OF THIS INVENTION

The objectives of this invention are:
(1) To provide an improved method of forming an elongated composite laminate in which there is no slippage between the pressure applying means and the laminate;
(2) To provide an improved method of forming an elongated composite laminate in which a sustained and uniformly high pressure is applied on the laminate during cure.

DRAWINGS

FIG. 1 shows an improved method of continuously forming a thermoplastic matrix or epoxy matrix composite laminate.

FIG. 2 shows details near the contact length formed by the cooperatively rotating set of deformable annular wheels illustrated in FIG. 1.

FIG. 3 illustrates a section through the contact region formed by the set of cooperatively rotating deformable annular wheels shown in FIG. 1.

FIG. 4 shows a first modification of the instant invention. In this figure a method of continuously forming a plurality of laminates is shown by using a series of cooperatively rotating annular wheels mounted on a common pair of shafts.

FIG. 5 shows a second modification of the instant invention. In this figure a method of continuously forming a metal matrix composite laminate is illustrated.

DESCRIPTION OF THE DRAWINGS

In FIG. 1 four elongated plies 19,20,21 and 22 are fed by rollers 15,16,17 and 18 respectively into chamber 7. As they enter the chamber they are guided by guide rollers 14. The plies are compressed between the annular wheels 3 and 4 along their contact length L. The annular wheels and the flexible means are designed to give a substantially uniform contact pressure along a greater part of contact length L. The compression begins at point 24 and continues until point 26 is reached. The plies are subjected to heat and pressure until point 25 is reached. The distance between points 24 and 25 is fifty to eighty percent of the distance between points 24 and 26. Between points 24 and 25 the epoxy in the plies cures under sustained pressure and elevated temperature. Between points 25 and 26 the laminate cools under pressure. As the annular wheels 3 and 4 rotate, the elongated plies are carried forward and emerge from chamber 7 as cured laminate 27. A jet of cold air is directed at the rims of wheels 3 and 4 as they emerge from the heated chamber 7. There is substantially no slippage between the rims of wheels 3 and 4 and the elongated plies along the contact length L.

Figure 1:
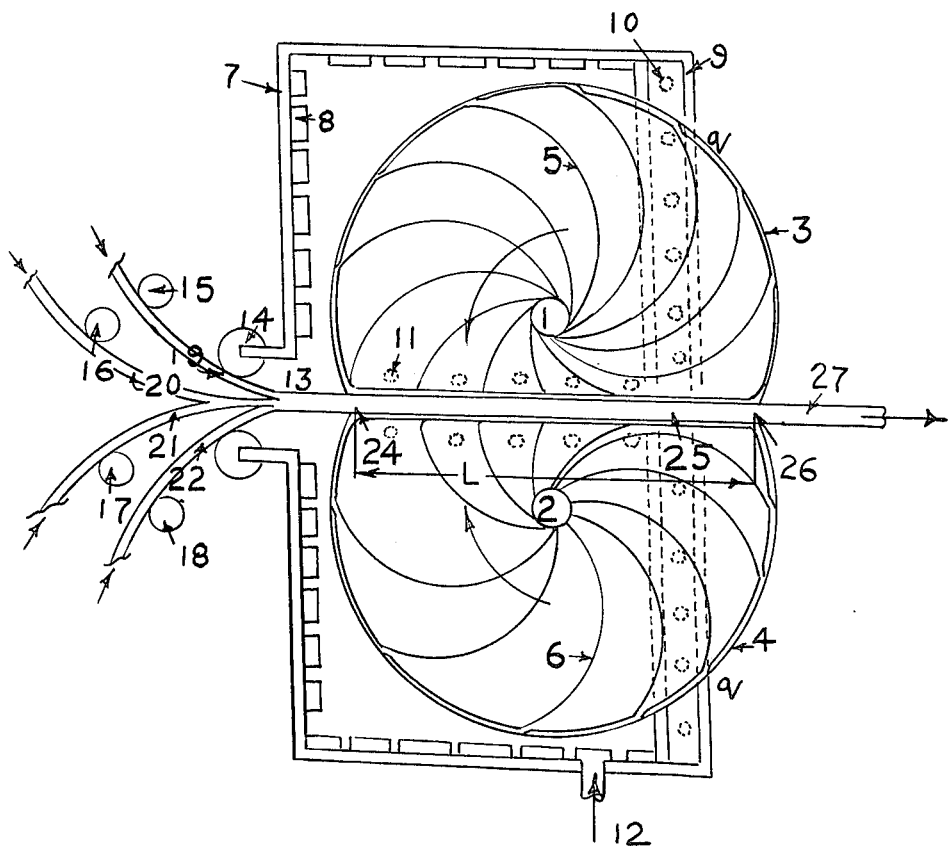
FIG. 1 shows a preferred embodiment of the instant invention. It shows a method of forming an elongated epoxy matrix or thermoplastic matrix composite laminate. A set of cooperatively rotating annular wheels 3 and 4 are radially squeezed against each other to cause a temporary deformation in each and a contact length L. Annular wheel 3 is connected to shaft 1 by flexible means 5. Annular wheel 4 is connected to shaft 2 by flexible means 6. The annular wheels 3 and 4 are partially enclosed in an insulated chamber 7 which is provided with heaters 8. At one end of the chamber is an insulated wall 9 provided with heaters 10. The wall 9 has an opening qq to allow the wheels 3 and 4 to rotate freely. At the other end of the chamber 7 is an opening 13 provided with guide rollers 14. Heaters 11 are located along the midsection of chamber 7. The heaters 8,10,11 together keep the chamber 7 at a temperature close to the curing temperature of the epoxy or thermoplastic used in the laminate to be formed. An inlet 12 enables compressed heated air to be admitted into the chamber 7 and to maintain a positive pressure in it. Air from the chamber 7 exits partially from the opening qq in the wall 9 at one end and partially from the opening 13 at the other end where guide rollers 14 are located. The positive pressure in chamber 7 ensures that outside cool air does not enter the heated chamber 7.
Figure 2:
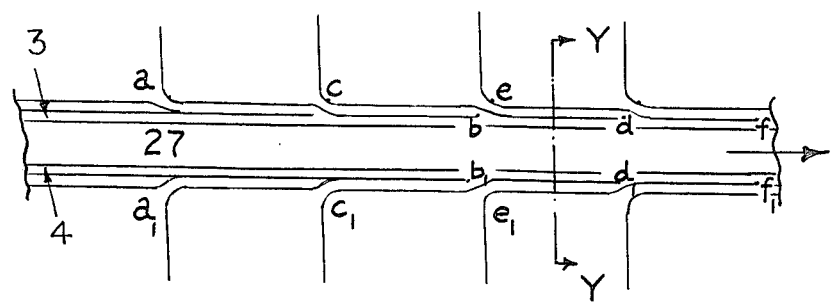
FIG. 2 shows an enlarged view along the contact length L. The rims of annular wheels 3 and 4 keep laminate 27 under sustained compression. Laminate 27 is a composite of four plies. The compressive effect of the rims of wheels 3 and 4 is reinforced by the flexures ab, $a_1b_1$,cd,$c_1d_1$,ef and $e_1f_1$.
Figure 3:
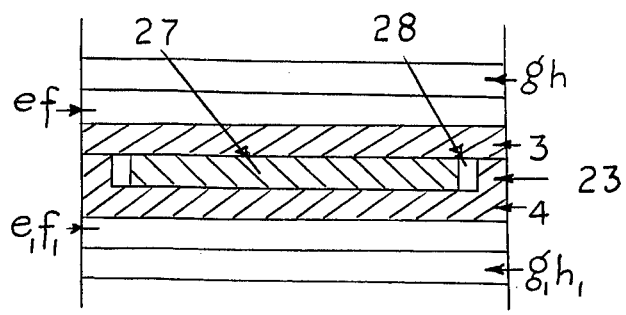
FIG. 3 shows a section YY through the contact length. The rim of annular wheel 3 is shown backed up by flexures ef and gh. Similarly, the rim of annular wheel 4 is shown backed up by flexures $e_1f_1$ and $g_1h_1$. The rim of wheel 4 is provided with flanges 23. The laminate 27 is clamped between wheels 3 and 4 and is carried between them without slippage. The width of laminate 27 is smaller than the width of rims of wheels 3 and 4 so that at either edge of laminate 27 a pocket 28 is created. The area of each of the pockets 28 is two to seven percent of the crosssectional area of the cured laminate. These pockets 28 serve to bleed excess epoxy or thermoplastic from the laminate.

This method offers the following advantages:
(a) There is substantially no slippage between the wheels 3 and 4 and the laminate 27;
(b) A sustained pressure is applied on the laminate during the cure stage;
(c) Cooling takes place under pressure.

EXAMPLE 1

An elongated isotropic laminate of graphite epoxy is produced using the instant invention. The laminate is eight plies thick. The layup sequence is $(0,+45,-45,90)_s$. This means there are eight plies with the graphite fibers in successive plies oriented in directions $0°,+45°,-45°,90°,-45°,+45°,0°$ in that order. The graphite epoxy system chosen for this illustration is GY 70/934. Prepregs of GY 70/934 are commercially available. This prepreg has GY 70 graphite fibers and 934 epoxy. The temperature in chamber 7 is held between 275° F. and 350° F. Each of the annular wheels 3 and 4 has a diameter of six feet. They are radially squeezed against each other so as to form a contact length L of four feet. The annular wheels and the flexible means are designed to produce a pressure between 80 psi and 100 psi along the contact length L. The deformations in the annular wheels and the flexible means are temporary. The wheels are cooperatively rotated so that their peripheral velocity is four inches per hour. The annular wheels 3 and 4 are located in the heated chamber 7 so that the distance between points 24 and 25 is 2 feet 8 inches so that it takes the laminate eight hours to traverse from point 24 to point 25. Curing takes place between points 24 and 25. Between points 25 and 26 the laminate cools under pressure for four hours. Thereafter the cured laminate exits from between the wheels.

This example is offered for a widely used commercially available graphite epoxy composite. Faster processing is possible using epoxy systems that cure more rapidly.

Figure 4:
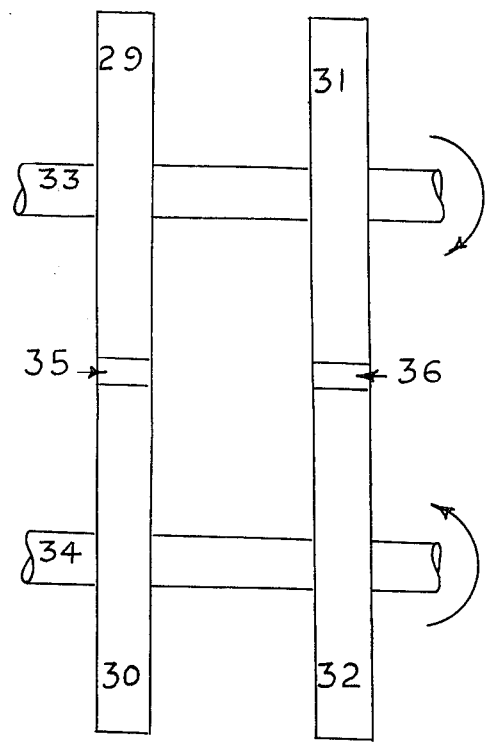

It may be appreciated that more than one set of cooperatively rotating radially compliant annular wheels may be mounted on a pair of common shafts and placed in a heated chamber. With this arrangement a laminate is formed between each complementary set of cooperatively rotating annular wheels with the result that a plurality of laminates is laid up and cured simultaneously. Such an arrangement is shown in FIG. 4 where annular wheels 29 and 31 are mounted on shaft 33. Annular wheels 30 and 32 are mounted on shaft 34. Laminate 35 is formed between the cooperatively rotating wheels 29 and 30. Laminate 36 is formed between the cooperatively rotating wheels 31 and 32.

EXAMPLE 2

FIG. 5 shows a method of continuously forming a metal matrix composite laminate. Two cooperatively rotating annular wheels 40 and 41 are radially squeezed against each other so as to form a contact length L. The radial deformations are such that they do not induce a permanent set in either wheel. Annular wheel 40 is connected to shaft 44 flexible means 42. Annular wheel 41 is connected to shaft 45 by flexible means 43. The annular wheels are completely enclosed in a heated chamber 46. The pressure in the chamber is kept positive by admitting pressurized Nitrogen into it. Metal matrix plies 47 and 50 are fed into the heated chamber 46 by feed rollers 48 and 49 respectively. In heated chamber 46 the plies pass through burnishing rollers. Ply 47 passes through burnishing rollers 51 and 52. Ply 50 passes through burnishing rollers 53 and 54. The burnishing rollers rotate in the opposite direction to the direction in which the plies 47 and 50 are being fed. After they are burnished, the metal matrix plies are heated by the heater 57 and are guided by the guided rollers 55 and 56 located in the heated chamber 46. Along the contact length L the plies are subjected to a sustained temperature and pressure. The action of heat and pressure on the burnished surfaces of the two plies bonds them together. Thereafter, the bonded laminate 60 is guided out of the chamber 46 by exit guide rollers 58 and 59.

For instance, when it is desired to make a laminate of graphite aluminum composite plies, the chamber 46 is preheated to a temperature between 700° F. and 1000° F. Each of the annular wheels 40 and 41 is six feet in diameter. The annular wheels are radially squeezed against each other so as to cause a temporary deformation in each so that a contact length L of two feet is created. The flexures 42 and 43 are designed to create a contact pressure of 4000 psi to 7000 psi. The Nitrogen pressure in the chamber is kept between 0.1 psi and 1 psi over atmospheric pressure. The annular wheels are rotated at a peripheral velocity of four feet per minute so that contact between the two plies 47 and 50 is held for 30 seconds. The extended period of contact between the plies at elevated temperature and pressure in a controlled atmosphere produces a laminate with a superior diffusion bond between the burnished plies. This is achieved without causing a substantial deformation in the plies as them move along the contact length L. There is substantially no slippage between the laminate and the annular wheels and the exit velocity of the laminate is substantially equal to the entrance velocity of each of the plies. Similarly, a laminate with more than two plies is made by increasing the number of feed rollers, burnishing rollers and preheaters to correspond with the number of plies being fed.

We claim:
1. A method of forming an elongated composite laminate, the method consisting of
   providing a pair of cooperatively rotating annular wheels which are temporarily deformed radially against each other so as to cause a contact lengh L and a pressure p between them,
   connecting each of said annular wheels to a rotating shaft by flexible means, locating said annular wheels partially in a heated chamber such that between fifty and eighty percent of the contact length L is enclosed by the heated chamber, keeping a positive pressure in the heated chamber by feeding compressed air into the heated chamber, feeding a plurality of elongated composite plies into the said chamber by roller means, so that said plies are clamped and carried by the annular wheels with no slippage between the annular wheels and the plies and are cured under sustained pressure and are subsequently cooled under sustained pressure and exit from between the annular wheels as an elongated cured laminate at a velocity substantially equal to the velocity of each of the elongated plies.

2. A method as in claim 1 wherein said elongated plies are of graphite epoxy, and said pressure p between the annular wheels along their contact length L is held between 80 psi and 100 psi, said chamber is held in the temperature range 275° F. and 350° F., and said positive pressure in the heated chamber is held between 0.1 psi and 1 psi above atmospheric pressure, and said annular wheels are rotated at a velocity such that the elongated plies are subjected to a pressure of 80 psi to 100 psi and a temperature of 275° F. to 350° F. for a period of six to ten hours, and are subsequently cooled at a pressure of 80 psi to 100 psi for a period of three to eight hours and exit from between the annular wheels as a cured elongated graphite epoxy composite laminate.

3. A method as in claim 1 wherein said elongated plies are of graphite aluminum, and said annular wheels are completely enclosed in said heated chamber, and said chamber is held in the temperature range 700° F. to 1000° F., and said positive pressure in the heated chamber is held between 0.1 psi and 1 psi above atmospheric pressure by feeding compressed Nitrogen into the heated chamber, and said pressure p between the annular wheels is held between 4000 psi and 7000 psi, and said elongated plies are burnished in the heated chamber by burnishing rollers, and the burnished surfaces heated before they come in contact with the annular wheels, and said annular wheels are rotated at a velocity such that the elongated plies are subjected to a pressure of 4000 psi to 7000 psi at a temperature of 700° F. to 1000° F. for a period of 10 to 45 seconds and exit from between the annular wheels as an elongated graphite aluminum composite laminate.

* * * * *